INVENTOR.
Kenneth W. Becker
HIS ATTORNEY

INVENTOR.
Kenneth W. Becker

HIS ATTORNEY

United States Patent Office 3,369,305
Patented Feb. 20, 1968

3,369,305
DESOLVENTIZING AND DEODORIZING SYSTEM FOR GRANULAR MATERIALS
Kenneth W. Becker, Pittsburgh, Pa., assignor to Blaw-Knox Company, Pittsburgh, Pa., a corporation of Delaware
Filed Oct. 11, 1965, Ser. No. 494,784
18 Claims. (Cl. 34—22)

ABSTRACT OF THE DISCLOSURE

Apparatus and process for continuously stripping solvent from granular material where the material is subjected to solvent stripping atmospheres in successive stages, which stages are substantially free of atmospheric interflow herebetween, and the material in one of said stages is subjected to a solvent stripping atmosphere which is recirculated continuously, the recirculated atmosphere is cleaned of solvent carried therein and is continuously revitalized by the addition of pure atmospheric portions at a point distant from said granular material.

---

This invention relates to the removal of solvent from a particulate free-flowing solid such as granular vegetable and animal materials which have been previously subjected to an oil extraction process, or pelletized solvent-wet synthetic resins or the like. More particularly, this invention relates to a unique system which combines the treatment steps of desolventizing and deodorizing to form a continuous-solvent-stripping process by means of a new and improved two-stage structural unit in a novel combination with other collateral apparatus.

It is a characteristic of some organic granular substances that high quality can only be maintained if the refining or solvent-stripping process is of a short time duration and is conducted at low temperatures. This invention and the method for its use, though widely adaptable, will be found specifically useful in the treatment of granular organic materials having such requirements. The invention will be explained and dealt with herein essentially in terms of its application in the processing of such residual solids from which oil has been extracted, but anyone skilled in the art will recognize its inherent versatility, which permits its adaption in any art requiring the separation of moisture from particulate material.

In the prior art, of which I am aware, various systems have been developed to strip solvent from granular organic solids. Such desolventizing systems generally involve sophisticated highly-automated machinery that agitates or centrifugates the solvent-wet granules through a chamber or series of chambers having an environment of high temperature gas therein such as superheated steam which vaporizes the solvent. The wet vapor is then continuously circulated through a collateral system where moisture is removed as a condensate, and gas is re-introduced to the chamber to repeat its function of contacting the solids. Following the initial solvent removal step, the substantially dry material is typically conducted through a deodorizing chamber where noxious vestiges of solvent remaining in the material which may tend to inhibit its usefulness or acceptance as a food, fertilizer, or other product are removed.

A myriad of different desolventizing systems exists in the art, each designed to achieve a specific kind of end product or in answer to particular problems which systems previous thereto had failed to solve. In spite of the many forward steps and accomplishments in organic solids processing, I have observed that cost of equipment and its operation can be substantially reduced, particularly so for the treatment of solids having certain inherent characteristics. I have also observed that in many instances an end product of higher quality could be achieved by less expensive equipment. More specifically, I have observed that present systems are not sufficiently adaptable to solid particles which require comparatively delicate handling to preserve their fragile composition. I have also recognized that in separating the oil from certain granular solids in the extraction process, solvent does not penetrate to the nucleus of the granule, so its removal should not necessitate the excessive agitation provided in present systems to assure total penetration by the contacting medium. With various other solids having an easily penetrated structure, thorough agitation is an unnecessarily time-consuming and expensive step in the treatment. There is also a class of granular solids, members of which may or may not have the latter characteristics, which are susceptible to damage if subjected to the shock of the high temperatures during the long retention times of conventional equipment.

In view of the foregoing observations, it is a primary objective of my invention to provide a system which combines in a unitized structure a desolventizer and a deodorizer which enables a low cost initial installation and comparatively inexpensive operation.

It is a further object of my invention to provide a new method and apparatus for continuously-operating two-stage desolventizing unit.

A further object of my invention is to accomplish the foregoing objectives in a manner that assures a product of comparable quality and, in certain given instances, a product of higher quality than that which is achieved with presently utilized equipment.

It is also an objective of my invention to present a system which is adaptable to processing a wide variety of materials, in accordance with their specific requirements. Thus, while it is anticipated that my system will be useful in many arts concerned with industrial processing, it is specifically directed toward free-flowing granular solids requiring low temperature and variable retention time for more efficient solvent-stripping treatment.

The accomplishment of the foregoing objectives is explained in detail in the ensuing description of my invention and the method for its use, and other objectives and advantageous features not yet specified will become apparent to anyone skilled in the art.

Summary of the invention

According to my method, pre-extracted solid particles are passed through a treatment unit having two treatment zones that are in direct communication and passage-alignment with each other. A unique and basic inventive concept of my method is that though the two zones are united in granular passage communication, the granules are subjected to first, a desolventizing operational stage, and then, an immediately subsequent deodorizing operational stage, with each stage utilizing separate solvent-stripping gaseous means of entirely different respective quantity, quality, and flow characteristics, with minimum interaction or interflow of the separate gaseous mediums between the two stages. The granular material is gravity-fed into the first stage, then immediately to the second stage, where, upon its entrance thereto it is characterized by having yielded most of its solvent in the first stage but having retained substantially all of the sensible heat it absorbed in the first stage. The material is removed from the second stage by discharging it therefrom at a rate of flow which is variably controlled so as to be consonant with the retention time requirements of the particular material. Inert gas is utilized as the basic desolventizing agent in both stages, however, the temperature, volume, pressure, humidity, and composition of the gas entering the first stage differs drastically from that of the second stage.

The novel manner by which I have combined within a single structure two non-communicating inert gas flows having entirely dissimilar flow characteristics is a notable feature of my invention. In stage one of my unitized desolventizing structure, I utilize parallel gas flow, that is, inert gas is passed through the granular material along a plurality of separate pathways, all of which are parallel with each other transversely to the path of the granules. The parallel gaseous crossflows transform, while inside the unit and amidst the granular material, into a local countercurrent flow, and then, prior to discharge from the unit, the gas again forms into a plurality of separate crosscurrent parallel flows which merge with each other outside the desolventizing chamber.

In the second or deodorizing operational stage of the unit, the gas flow can be described as a series flow, since it is a flow generally countercurrent to the direction of the flow of granular material but not as a direct countercurrent flow. The gas flow enters at one end of the deodorizing chamber as a plurality of separate flows, and it is removed at the opposite end of the chamber as a plurality of flows, but between entrance and discharge, it undergoes a constant mixing and redistribution with respect to the solids in an overall series pattern as compared to the parallel flow in the primary desolventizing stage.

The separate gas flows utilized in the two stages of the operation of the system may be provided from the same initial source, however, the inert gas utilized in the deodorizing stage is conducted thereto continuously and directly from the source, while a high volume flow of inert gas is at the same time continuously recycled through the first or desolventizing stage and is variously treated along the recycling route by auxiliary apparatus which removes solvent, reheats the gas, and adds make-up constituents.

Recirculation of an inert gas through a desolventizer, followed by relatively pure gas being conducted through a deodorizer is not new to the art, nor is the basic concept of a vertical, gravity action apparatus. For example, the system disclosed by E. H. Leslie in U.S. Patent No. 2,571,143 specifically provides for a desolventizer mounted vertically so that particles can move therethrough by gravity flow. It is also provided that vapors evolved from the particles are removed near the top of the chamber, reheated, then reintroduced at the bottom of the chamber. A deodorizer to be attached to the desolventizer is optionally provided in Leslie's vertical embodiment and in all his embodiments he specifies an internal moving means of agitating the particles to assure thorough desolventizing. Leslie's apparatus and method for its use represents a stride forward in the art. On the other hand, the system of my invention is gentler, much less costly, and capable of more efficiently delivering a higher quality product in a specialized field of application, than that of the Leslie patent and so many others in the field which were purposely designed to cover a broad class of organic solids.

I also acknowledge the apparatus of Karnofsky, as presented in U.S. Patents 2,691,830 and 2,811,539 as advancements in the art, exemplary of recent worthy contributions thereto. Although Karnofsky recognizes the need for more unified apparatus in the desolventizing art, he, like Leslie, provides specifically for a system involving motor means for agitation of the particles under treatment. Here, too, the inventive contribution is so broad and all-inclusive that no particular provision has been made for delicate materials that are sensitive to excess agitation, or for materials where artificial agitation or high temperature or fixed retention time is an unnecessary if not a detrimental part of the treatment.

*Detailed description*

My method will be more perfectly understood and the novel features of my apparatus more easily ascertained by references to the accompanying drawings which are only illustrative and in which.

Figure 5:
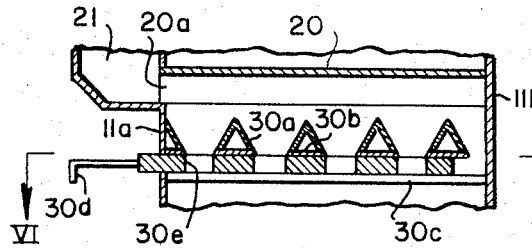
Figure 6:
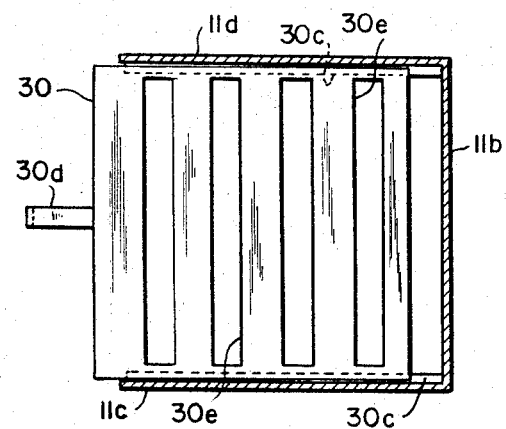

FIGURES 5 and 6 are showings of a unique slide gate arrangement required in initially starting the operation of the system, as will be explained in detail in a later section of this description dealing solely with the starting procedure. FIGURE 5 is a fragment of a vertical section taken along line V—V of FIGURE 1; and FIGURE 6 is a top plan view of the slide gate taken along line VI—VI of FIGURE 5.

Figure 1:
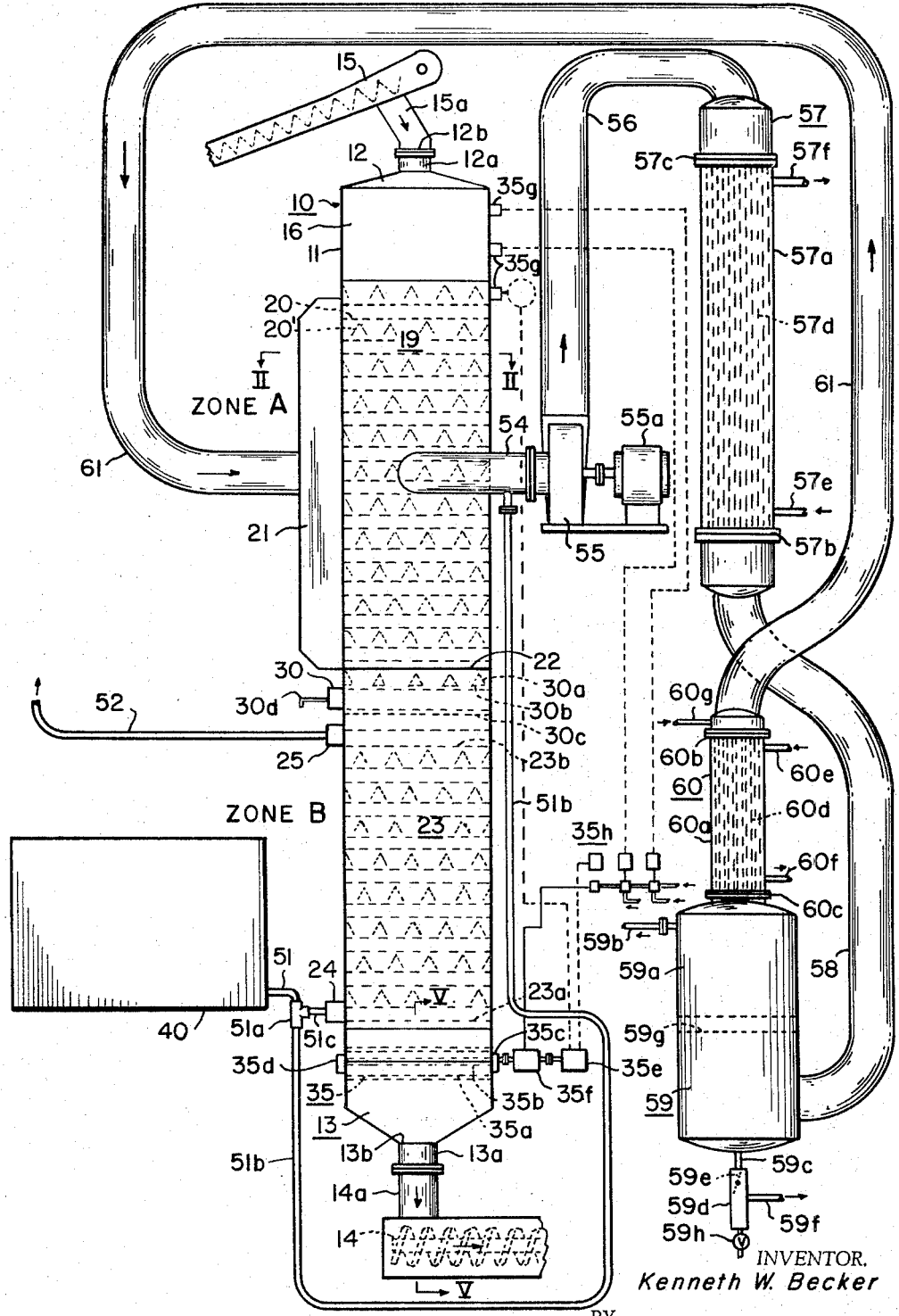
FIGURE 1 is essentially a flow diagram of my new system and the apparatus thereof in combination, with certain apparatus shown in elevation and others shown partially cut away to reveal the internal structure therein.
Figure 7:
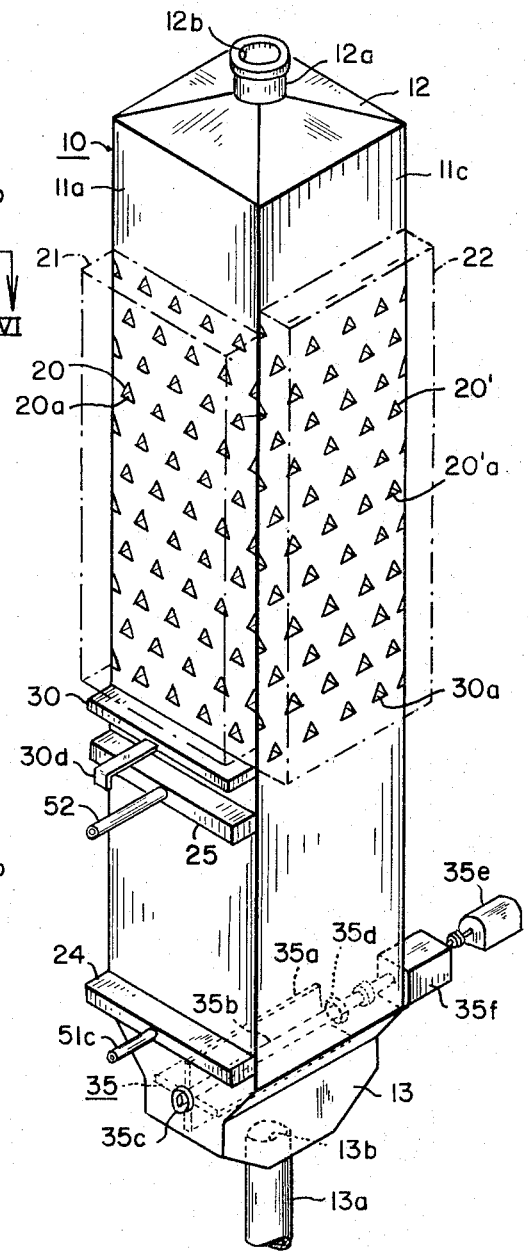

FIGURE 7 is a full view of my desolventizing-deodorizing unit shown in perspective so as to more clearly illustrate certain structure features not clearly visible in detail in FIGURE 1.

(1) APPARATUS OF THE SYSTEM

In accordance with the desolventizing system presented by this invention, the apparatus therefore broadly comprises as shown in FIGURE 1 a two-stage desolventizing-deodorizing unit 10 having stages or zones A and B, with each zone being interconnected by means of various conduits and pipes to collateral equipment necessary to the proper operation thereof.

The collateral equipment in the combinations can be grouped according to its purpose: a source 40 of inert gas for the system is provided. This may be an inert gas generator, bottled nitrogen, or any other source known to the art. All other major equipment is constituent to the inert gas recycling conduit serving Zone A and comprises a vapor blower or motor actuated pump 55, a vapor condenser 57, a separating tank or drum 59, and a vapor heater 60.

The main structural shell or housing 11 of the desolventizing-deodorizing unit 10 has the shape of a slender vertically-elongated four-sided oblong tube. The sidewalls of the oblong housing 11 are of equal width, with each at a right angle to each adjacent side. The oblong, vertical housing 11 has a dome 12 at its upper end with an inlet-sleeve or neck portion 12a having a material-inlet opening 12b provided through the center thereof. The lower or bottom end of the housing 11 is an inverted dome or funnel portion 13 with a material discharge opening 13b provided through a short funneling neck 13a. The neck 13a joins to a receiving tube 14a leading to a typical horizontal conveyor 14.

The internal structure of the desolventizer unit 10 can be clearly understood when considered in terms of granular material progressively moving therethrough. A common-type conveyor means 15 is utilized to conduct solvent-wet granular material from an extraction operation to the upper end of the desolventizer unit 10. The granules enter the unit 10 by way of a conveyor extension tube 15a and move through the short neck portion 12a by means of gravity flow, which is the means of propelling the granules down the full length of the unit 10 for the entire desolventizing operation. After moving through the short neck portion 12a, the granules enter a hollow or stacking region 16, one sidewall of which is equipped with sensing devices 35g as part of discharge control mechanism 35 which regulates the continuous operation of the system as will be mentioned in greater detail as this description proceeds.

From the stacking region 16 the granules fall into the area of the first operation stage of the unit, Zone A. In this zone the material is sifted and redistributed by means of a series of banks of baffles 19, which are preferably cross-stacked in alternate banks as shown. Each of the baffles 19 extends laterally across the full width of the housing 11 of the unit 10, and is in the shape of an inverted V-trough. The baffles 19 of each bank are installed spaced equally apart in horizontal rows, with the plurality of baffles making up the first bank or uppermost horizontal level or row and every alternate bank being gas inlet or distribution baffles 20. Interspersed between each two rows of distribution baffles are cross-stacked rows or oppositely-laterally-extending baffle rows which act as collection hoods or exhaust baffles 20'. It should be noted that each of the baffles making up distribution banks of baffles 20 and collector banks of baffles 20' has an open end and a closed end.

Figure 2:
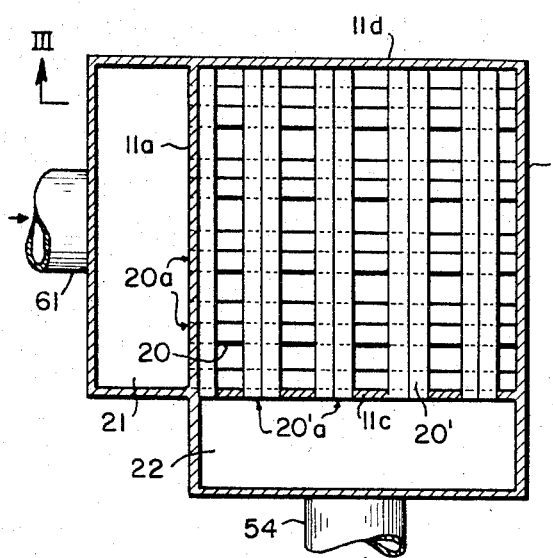
FIGURE 2 is a sectional view taken along line II—II of FIGURE 1.
Figure 3:
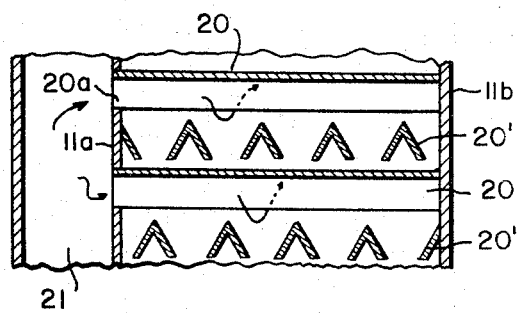
FIGURE 3 is a fragmentary view representing a vertical cross-section of my unitized desolventizing-deodorizing structure taken along line III—III of FIGURE 2.

As shown particularly by FIGURE 2, one end of each baffle 20 is provided with an opening 20a through a sidewall 11a where such end is contiguously mounted, and the opposite end of the same baffle 20 is mounted in an abutting relationship against the opposite sidewall 11b, the surface of which has no openings therethrough. Thus, the alternate parallel rows of coextensive baffles 20 have their open or communicating ends in a common sidewall 11a, and the parallel rows 20' that are intercrossed with rows 20 have open ends 20'a in the common sidewall 11c, and closed ends at the common wall 11d.

A large intake plenum chamber 21 is attached to the sidewall 11 of the unit 10 to communicate with the inlet or distribution baffles 20. The alternate rows of baffles 20' which are for gas collection, coextensively communicate with a second substantially large plenum chamber 22 which is a gas exhaust chamber mounted exteriorly on the unit 11 on a sidewall 11c thereof that is adjacent to the sidewall 11a to which the intake plenum 21 is attached.

Each row of baffles is mounted with the plurality of baffles comprising it offset in relation to its next adjacent coextensive row so that each baffle is in vertical alignment with the open space between two baffles in its next coextensive row.

Granules moving out of Zone A and into Zone B of unit 10 again encounter a bank of cross-stacked, parallel rows of baffles, one purpose of which is to continue the constant re-arranging of granules in the mass as it slowly progresses downward along the length of the unit. Unlike the similar baffle arrangement in Zone A, the baffles 23 in Zone B do not have alternate rows of baffles acting as a means of gas collection for conduction to a common exhaust plenum chamber. In the baffle arrangement 23 in Zone B the lowermost row of baffles 23a is in communication with an intake manifold 24, as shown in FIGURE 1. The height of the intake manifold 24 is limited to slightly more than the altitude of the triangular openings through the sidewall of unit 10 by which it communicates with the baffle row 23a. The uppermost row of baffles, 23b, comprises the collector baffles for the entire Zone B and is in communication with an exhaust manifold 25 which is of identical shape and size to the intake manifold 24. Thus, the rows of baffles intermediate the row 23a and row 23b have as their secondary purpose the function of gas dispersion of the series gas flow which enters Zone B at the intake manifold 24 and exits at exhaust manifold 25.

Since a particular adaption of my system to granules of various inherent physical characteristics will determine the amount of time required for proper treatment, means for varying retention time of granules within the unit 10 are provided in the form of a discharge feeder mechanism 35. The feeder mechanism 35 broadly comprises a longitudinally-elongated propeller or paddle wheel 35a mounted on a transverse center shaft 35b. The shaft 35b is supported by typical bearing assemblies 35c and 35d, each of which is contiguously-mounted to a wall of the unit 10. An automatically controlled actuating motor 35e is provided to rotate shaft 35b, and intermediate the propeller 35a and the motor 35e is a typical gear reduction box 35f. The automatic means for controlling the motor 35e comprises pressure sensitive devices 35g mounted at the upper end of unit 10 and electrically-interconnected to typical automatic switch means 35h.

The operation of the discharge mechanism 35 may be better understood with reference to FIGURE 7 which illustrates that two contrapositioned sidewalls of the housing 11 of unit 10 are caused to taper inwardly toward propeller 35a and direct the granule flow to the feeder mechanism 35. Thus, the lower end of unit 10 undergoes a compound transition leading from immediately below Zone B to the opening 13b where granules flow out of the unit 10.

Referring now in detail to the structure of the apparatus utilized in the recycling circuit of the desolventizing system, as shown in FIGURE 1, the condenser 57, separating tank 59, and heater 60 are new to the combination embodied in this invention, but each considered alone is familiar in the art. These components are interconnected by the recycling conduit which for clarity is designated when referring to the drawing as segments between major components of the circuit.

The condenser 57 has an outer housing or cylindrical tube 57a, and is interconnected to the recycling conduit at its top and bottom ends. Within the condenser housing 57a plurality of tubes 57d extends between tube sheets 57b and 57c, thus forming a continuous path through which gas is conducted. The rate of flow of the cooling water around the tubes 57d is preferably automatically controlled so that the solvent-bearing gas which passes through the condenser 57 and through the tubes 57d will be reduced to a composition that is part vapor and part liquid as it moves toward the separating tank 59 by way of conduit segment 58. Here the condensed liquid and gas are separated by gravity and the mist extractor 59g. Conduit 59b is provided to vent excess gases.

In a preferred embodiment the vapor heater 60 of the recycle circuit is mounted vertically above and contiguous to the separating tank 59. The heater 60 has a cylindrical outer casing or shell 60a containing tubes 60d between tube sheets 60b and 60c'. The lower end of the heater communicates with the interior of the tank 59, and the upper end of the heater 60 leads to the conduit segment 61. An inlet pipe 60e to conduct steam through the shell surrounding tubes 60d within the heater 60 is provided, and an outlet pipe 60f leads from the steam chamber shell 60a. A third pipe 60g projecting from the heater casing 60a is an inlet to enable the introduction of steam directly into the flow of heated gas as the flow moves toward the conduit 61.

Below the tank 59 and communicating therewith by means of pipe 59c extending from the center of the tank bottom is a fines residue collector 59d which in structure is a slender tube with an internal baffle 59e positioned substantially as indicated in the drawing. The condensed solvent and water from the tank 59 will flow through the pipe 59c and through the top of the residue collector 59f where it must move around the baffle 59e before leaving the collector by means of the side drain pipe 59f. The residue collector 59d is a simply-constructed means of allowing dust and fine particles in the decanted solvent solution to drop out by gravity motivation. A hand-manipulated valve 59h should be provided to allow periodic removal of the residue that will build up over a period of time in the lower end of the collector. Conduit 59b connecting into tank 59 vents excess gas.

It should be noted that along the lengths of the various conduits and pipes within the system, instruments such as pressure gauges and thermometers are to be utilized where needed to visually ascertain proper operation, and manually-actuated and automatic flow control valves are employed wherever practical for affording systematic control.

(2) STARTING THE SYSTEM

A unique feature of the invention is the adjustable slide gate 30 which is positioned intermediate the Zones A and B of the desolventizing unit and is capable of closing off one zone from the other to effectively eliminate communication therebetween during start-up or shut down. A single row of spaced-apart baffles 30a is provided as part of the slide gate arrangement, such baffles being similar in shape to those utilized in Zone A and Zone B. The purpose of the row of baffles has nothing to do with gas dispersion, rather it is a "dummy" set, and each baffle in the set may be closed off by adding thereto a horizontal bottom wall 30b. The transversely-movable portion of the gate arrangement is a slotted plate 30 with slots 30d therein that are equal in number to the spaces or openings between the dummy baffles 30a, with the width of each slot being equal to the width of each of the spaces between baffles.

When the slide gate or plate 30 is in the open position, granules are freely moved by gravity flow from Zone A to Zone B. The slide gate 30 is not a square configuration; the dimension taken transversely along the slots is purposely shorter than the width of the unit 10 sidewalls along the direction in which the gate slides. This enables the gate 30 to be slid by manipulation of an exteriorly projecting control arm 30d, a distance in either direction equal to the width of one slot 30e or the width of an opening between adjacent dummy baffles.

In commencing operation of the system, the slide gate 30 is placed in a closed or "start" position. Inert gas is supplied from source 40 at a predetermined temperature, through the pipe 51. The flow of inert gas is diverted into two flows at a tie fitting 51a. A direct flow commences along the pipe 51c through the Zone B intake manifold 24 and into Zone B where the inert gas then rises upwardly through the honeycomb of baffles 23 therein, until, at the uppermost row of baffles it is shunted out through the Zone Z exhaust manifold 25 and is finally exhausted out of the system by means of a pipe 52.

A branch pipe 51b leading from the fitting 51a receives part of the inert gas flow coming from the source 40 and introduces it into the vapor recycling circuit which at this point is not yet in operation. Inert gas supplied by the pipe 51b is the means of "loading" and initially preheating the recycling conduit circuit.

The inert gas coming from the pipe 51b enters the conduit segment 54 and moves therethrough toward a low pressure area created by the motor actuated vapor pump or blower 55. The gas is propelled from the blower 55 along the conduit segment 56 and into the recycle condenser 57. The gas then moves from condenser 57 into conduit segment 58, and thence, into the lower end of the separating tank 59. From the tank 59 the inert gas moves upwardly and directly through the vapor heater 60 and then, by means of a conduit segment 61, it is introduced into the intake plenum 21 attached to the unit 10. Since, at this stage in the starting operation, Zone A is devoid of any granular material to cause gas-flow resistance, and a low-pressure area or partial vacuum has been created therein due to the pumping action of the vapor blower 55, the inert gas will be drawn comparatively quickly up through Zone A and laterally outward beneath the plurality of collector baffles 20' and into the exhaust plenum chamber 22. The inert gas then completes its first recycling circuit by moving through the conduit segment 54 and intermixing with inert gas coming into the recycling circuit from the pipe 51b. The recycling of gas repeats continuously as described until, by means of suitable gauges along the recycling circuit, it is determined that sufficient volume and temperature have been reached.

It is at this point that the grain feeder or inlet conveyor 15 is actuated and granules, still wet with solvent from the preceding extraction process, are funneled in through the upper end of the desolventizing-deodorizing unit 10. Since the intermediate slide gate 30 between Zones A and B is closed, the granules will sift down through the Zone A baffles, begin to pile up on the gate and gradually entirely fill the upper half or Zone A of the unit 10. It is not until the top surface of the stacked granules reaches a point substantially at the extreme upper end of the unit 10 housing that the intermediate slide gate 30 is opened and adjusted.

The first adjustment of the slide gate 30 is to open it slightly so that the granules stacked thereon can begin to dribble through at a rate of flow preferably equal to the rate of flow of granules moving into the upper end of the unit 10. Since the power feeder mechanism 35 at the bottom end of the unit 10 has not yet been actuated, the granules moving down from the area of the slide gate 30 will commence to pile up and fill the Zone B area of the unit. It is when the full length of the unit 10 is substantially filled with granules that the slide gate 30 is moved to its wide open position and the power feeder or discharge mechanism 35 which controls the discharge of the granules from the unit 10 is actuated to complete the starting operation preliminary to the continuous functioning of the system.

Starting the system in the manner described is important because no matter what the nature of the solids being processed, an adequate time of retention of the granules within the unit is critical to adequate treatment. Variable retention time is possible, depending on the characteristics of the particular granules by varying the speed of the power feeder mechanism 35.

If the slide gate 30 was not adjusted slowly during the start-up to allow the granules to completely fill the unit, various levels of granules would receive more than adequate treatment while other levels would be untreated. If the slide gate was opened fully before Zone A was completely filled, the retention time would not only be inadequate but the recycled gases from the intake plenum chamber 21 would, like an electric current, attempt to follow the path of least resistance and move upward in the plenum to enter the pockets beneath the distribution baffles 20 where no granular material was yet present. Thus, the granules in the lower part of Zone A would still be substantially wet with solvent when released into Zone B.

Anyone skilled in the art will understand the means of automatically controlling the speed of the power feeder mechanism 35 by pressure-sensitive level-gauges 35g, located near the upper end of unit 10, and it will be further understood that the adjustable slide gate 30 can be automatically motor-actuated with the actuation and degree of adjustment thereof being controlled by additional level-sensing equipment installed for the purpose.

(3) OPERATION AND PROCESS

An excellent illustration of an important application of my system which will serve to emphasize its unique operative features is the removal of solvent from rice subsequent to its extraction treatment as illustrated in the Truman B. Wayne Patent No. 3,085,013 and with the liquid hydrocarbon hexane, an organic solvent, utilized as a means of extracting the oil therefrom. The term "organic solvent" as used herein refers generally to a solvent which is usually considered to be part of organic chemistry and, specifically, to one containing carbon.

Rice is of the class of oil bearing materials consisting of discrete particles that require relatively delicate handling and low temperature treatment to avoid particle fragmentation or destruction of cellular structure. Thus, it is ideally suited to demonstrate the operation of my system and to illustrate the specific features therein.

Prior to the oil extraction, the rice kernel consists of a particulate nucleus encased in several circumferential layers. Contiguous to the particle is what is known as the polish layer and surrounding that is an intermediate layer of bran with the kernel being enclosed in an outer layer known as the husk or hull. Before reaching the solvent removal process, the husk layer had been removed and the kernel has been subject to a process directed essentially to the removal of oil from the bran layer in which the bran itself was removed for separate final treatment.

Thus, a mass of solvent-wet rice particles, substantially bran free, are transported by conveyor means to the upper or entrance end of my unitized desolventizing structure 10. Since the object of the preceding extraction process was aimed not at the particles but at the bran layer, the granules moving through the layer into the desolventizing system will generally contain a peripheral surface-penetration of solvent. No free flowing solvent accompanies the granules and thus the mass thereof will evince behavior pattern characteristics of a flowing conglomeration of loosely associated or non-adhering particles as compared to the characteristics of a slurry or a moisture-soaked powdery substance that would have a consistency of a deformable sticky mass.

In the treatment of this material, the purpose of the first stage or Zone A of my unit is to separate the bulk of the residual solvent, as for example, well above 90%, and to do it in a manner in which no means of moving or induced agitation is present to inflict damage to the delicate particles. It is a critical concept of my invention that no greater agitational force is applied to the particles therein than that which would be naturally involved if the particles were being gently and very slowly poured back and forth between two containers.

At peak operation, both Zones A and B of the desolventizing unit 10 are filled to capacity with a mass of granules that, as an entity, will slowly creep at a predetermined rate of speed, toward the lower outlet end of the unit, but the rice particles within the mass will undergo constant reformation or ever-changing kaleidoscopic-like patterns as they sift through the maze of cross-stacked baffles.

Under conditions of full operation, that is, after the starting procedure has been completed, the desolventizer-deodorizer unit 10 is substantially filled with rice granules under treatment. The rate of flow of granules leaving the unit is maintained by the automatically-controlled feeder mechanism 35, at the same flow rate as that of the granules entering the unit by way of conveyor 15.

The granules sifting slowly down through Zone A of the unit 10 are subjected to penetration by the recycled inert gas moving into the zone in a formation or plurality of parallel transverse flows. Through a step which can be described as a flow countercurrent to the generally downward granule flow, the gas undergoes a transitional step in which the incoming transverse parallel flows change to outgoing transverse parallel flows. This use of such a symmetrical pattern of gas pockets as created by the inverted V-trough baffles has proven an excellent method of assuring complete gas dispersal throughout the granule mass which totally eliminates gas flow "cracks" or channels through the mass. The temperature of the recycled gas entering through plenum-chamber 21 is preferably held at 120° F., and the volume and rate of flow through the zone is preferably such that the gas flow leaving through the plenum chamber 22 and conduit 54 will be at a temperature of approximately 100° F.

Commercial hexane has a boiling range between 140° F. and 150° F., and I have found that a much improved product can be obtained by maintaining the temperature of the rice granules under treatment at substantially below such range, such as approximately 110–120° F. In comparison to the solvent-wet granules coming into Zone A of the unit 10, the recycled inert gas is comparatively dry so that a primary effect of the gas on the granules is similar to that which a dry wind or any comparatively dry moving body of air would have on a comparatively moist permeable surface. It must be understood that the effectiveness of the recycled gases on the granules in Zone A is essentially a function of the exceedingly high volume of gases moving therethrough, and not, as in other systems, dependent upon high temperature evaporation or boiling.

In the instance of wet rice coming in on the conveyor 15 to the unit 10 with a heat content equivalent to the ambient atmospheric temperature of the processing plant, the comparatively greater temperature of the recycled inert gas has been found to have an effect on particulate materials such as rice that is additionally beneficial to the process. As mentioned previously, the core of rice granule and such similar substances will not have been penetrated by solvent during the oil extraction process, and the layer of solvent penetration which surrounds the core can be described as comprising two sub-layers: just beneath the extreme outer surface is a coat of solvent that will be readily removed by the inert gas which will penetrate therethrough shortly following the granule's entrance into Zone A; and just beneath this outer coat of solvent is a layer of underlying solvent that is not initially susceptible to immediate removal when the granule first encounters the inert gas flow. It is here that the sensible heat in the recycled gas flow lends a valuable assist in the solvent removal process, and to understand how this is accomplished it is necessary to first consider the nature of the core of the granule. The core or nucleus of the granule has remained solvent free throughout the preceding extraction process, and it still contains the original atmosphere of its natural state, that is, the cellular structure of the core contains a volume of air and water. The heat introduced to the granule in Zone A of the unit 10 causes an expansion of the air and water in the core that in turn tends to push the remaining solvent toward the granule's surface while also slightly diluting the solvent. This enables the constantly moving high volume of inert gas in Zone A to then complete the desolventizing process previously described.

As the granules move from Zone A down the unit 10 and into Zone B, only traces of effluvium remain to be removed to attain a thoroughly deodorized product. The relatively clean inert gas that moves countercurrent to the granule flow through Zone B in a predominantly series relation thereto is thus in the nature of a final stripping process. The inert gas moving from the source and into the Zone B of the unit 10 is preferably at a temperature ranging between 85° F. and 105° F. It should be noted that the granules moving into Zone B are preheated, still retaining the sensible heat absorbed in Zone A, so effective deodorization of the granules can be accomplished with the substantially pure inert gas at a comparatively lower temperature, and the temperature is also such that it will render a substantially cool final product leaving Zone B by way of the feeder mechanism 35.

It is important that the rice granules be protected at all times from damage as they are being processed, so in addition to limiting the force of agitation in my apparatus, I also provide means to eliminate the possibility of thermal shock damage from rapid temperature change. The only drastic or rapid change in temperature that the particles encounter is in Zone A where they are contacted by the heated recycled inert gas desolventizing agent. I have found that the thermal shock to the particles can be reduced by the addition of water vapor to the recycled gas. This is accomplished by an introduction of sparge steam through a pipe 60g as shown in FIGURE 1 which is preferably situated so as to introduce the steam to the inert gas flow immediately after it is reheated in the vapor heater 60. The amount of water vapor injected into the heated inert gas flow should be preferably regulated in accordance with the specific characteristics of the product under treatment.

Figure 4:
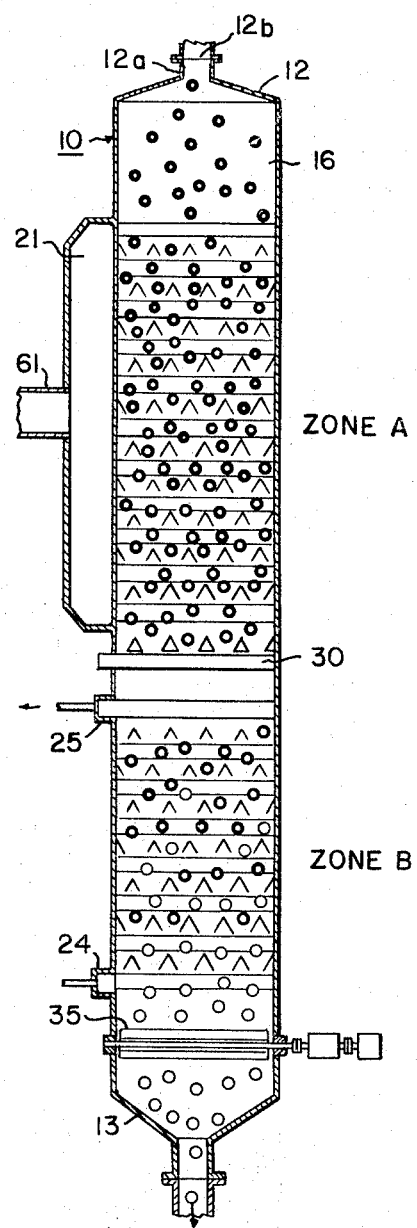
FIGURE 4 is a graphic illustration to be utilized herein to typify the progression of granules through my apparatus, and the process which occurs therein.

FIGURE 4 is a graphic illustration showing the effect of the two Zones A and B on the rice or other granules processed therethrough. Granules entering through the opening 12b will be substantially wet with solvent as indicated by the circles representing granules as shown. By the time the granules have crept through Zone A to the lower end thereof, they have given up essentially all of their solvent to the plurality of parallel gas flows within the Zone A. When the granules move into Zone B, only solvent traces remain with the granules to be taken away by the relatively pure series flow of inert gas therein. And when the granules are finally ejected from the deodorizing Zone B, no traces of solvent can be detected by the taste or olfactory senses of either domestic animals or humans.

I claim:

1. In a system for removing a volatile liquid from fragile particulate material impregnated therewith, in combination:
   (a) a vertical housing forming along the length thereof a plurality of chambers interconnected in particle-flow communication with adjustable means between said chambers to reduce and eliminate said communication;
   (b) said housing having at the upper end thereof an entrance for said particles, said entrance leading into a first of said chambers;
   (c) said housing having at the lower end thereof an exit for said particles;
   (d) internal stationary means for conducting open parallel flows of recirculated inert gas laterally within said first chamber;
   (e) an inert gas recirculating conduit having both input and output ends connected to the sidewalls of said housing and opening into said first chamber by means of a plurality of input and outlet apertures;
   (f) an inert gas supply means interconnected near one end of another of said chambers for supplying an inert gas flow thereto;
   (g) said other chamber having an inert gas exhaust conduit extending therefrom near the end away from said inlet pipe;
   (h) said other chamber further having internal stationary means spaced generally longitudinally therethrough for continually dispersing and disorienting said inert gas flow.

2. Apparatus as described in claim 1 as characterized by said internal stationary means in said chambers comprising a plurality of inverted V-shaped baffles.

3. Apparatus as described in claim 1 as characterized by means being provided for supplying inert gas at constant pressure to the system of said first chamber for maintaining said system at a constant pressure.

4. Apparatus as in claim 1 as characterized by having at the lower end of said housing a flow control means for maintaining said housing in a material full condition during the operation thereof.

5. Apparatus for removing organic solvent from a particulate material comprising a means for contacting said material with a large volume parallel flow of an inert gas below the volatilization temperature of said solvent, means for contacting said material with a low volume series flow of an inert gas below the volatilization temperature of said solvent, means for recycling said large volume gas including cooling and heating means and means for supplying inert gas at constant pressure to said means for recycling so as to maintain a constant pressure in said means for recycling.

6. Apparatus for removing solvent from a processed vegetable material wherein said material is fed through an elongated vessel containing a plurality of material reorienting baffles, said material being allowed to move therethrough in response to gravity while constantly removing treated material from the bottom of said vessel and new material is added at the top of said vessel and wherein an inert gas is caused to be introduced to said vessel under a first plurality of said baffles, and removed through a second plurality of said baffles individually adjacent to said first baffles and wherein a second flow of inert gas is caused to be introduced to a third set of baffles and removed therefrom through a fourth set of baffles, said fourth set of baffles being distant from and separated from said third set by a plurality of stationary reorienting baffles.

7. Apparatus for removing residual organic solvent from vegetable seeds comprising an elongated vertical vessel having deflecting baffles spaced periodically therethrough, means for supplying a first flow of inert gas below the vaporization temperature of said solvent to one side of a section of said vessel, means for removing said inert gas with solvent vapor therewith from a second side of said section in a plurality of parallel streams and incorporating means for supplying a second flow of inert gas to one end of an elongated section of said vessel and removing said second flow from the other end of said section, said second flow being in a single series stream through said seeds.

8. Apparatus for desolventizing a fragile solid particulate vegetable material for human consumption comprising means for contacting said material through a plurality of parallel flow patterns with a recycled inert gas and means for continuously contacting said material through a series flow pattern with an inert gas supplied directly from an inert gas source, means for supplying inert gas of constant pressure to the recycling system of said parallel flow patterns and means for moisturizing said recycled inert gas.

9. Claim 8 as characterized in that said means for moisturizing comprises means for introducing water vapor.

10. Apparatus for removing residual solvent from fragile organic particles comprising: a housing, a plurality of inverted V-shaped baffles in horizontal banks, each successive bank being spaced substantially throughout said housing; means for supplying a recirculated inert gas to alternate banks to remove the gas from the banks of baffles in a first section of said housing; means for supplying inert gas to a plurality of baffles at one end of a second section of said housing; means for removing the gas from said second section through baffles near the other end of said second section; means for removing part of the solvent from the recirculated gas; means for reheating said recirculated inert gas; means for supplying additional inert gas at constant pressure to the recirculating system of said first section; and means for supplying particles to be treated to said first section.

11. A process for removing residual organic solvent from solvent-extracted organic particles comprising the steps of closing an elongated vertical vessel intermediate the ends thereof, charging said particles into the upper portion of said vessel until said upper portion is substantially filled, causing an inert gas to flow along a plurality of separate horizontal flow patterns through said upper portion, allowing said particlues to flow out of said upper portion and into said lower portion at a rate equal to the rate of flow of particles into said upper portion, introducing a second inert gas flow near the bottom of said lower portion of said vessel and removing said second inert gas flow from said lower portion near the top thereof, causing an unrestricted flow of said particles between said upper portion and said lower portion after said lower portion is filled with particles, and thereafter controlling the flow of particles from said lower portion at a rate which maintains said upper portion in a substantially filled condition.

12. The process in claim 11 wherein the inert gas leaving said upper portion is recycled through a condenser and a heater to said upper portion while supplying additional inert gas as required to maintain a constant pressure in said system to said lower portion which is solvent free gas from an inert gas generator.

13. Apparatus for removing residual solvent from fragile organic particles comprising an elongated housing, a plurality of baffles of inverted V-shaped cross section extending across the width of said housing and arranged in rows, each successive row being alternately disposed at an angle to the preceding row and said baffles being spaced throughout said housing, means for supplying a recirculated inert gas to alternate rows of baffles and to remove the gas from the intermediate rows therebetween in a first section of said housing; means for supplying inert gas to a plurality of baffles at one end of a second section of said housing and means for removing the gas from said second section through baffles near the other end of said second section; means for removing part of the solvent from and reheating said recirculated inert gas, and means for supplying additional inert gas at constant pressure to the recirculating system of said first section, and means for supplying particles to be treated to said first section.

14. Apparatus for continuously stripping solvent from granular material comprising successive chambers containing solvent-stripping atmospheres within said chambers and connections between said chambers whereby said chambers are in direct granular-passage communication with each other but are substantially free of atmospheric interflow therebetween, a means of recirculating at least one of said solvent stripping atmospheres continuously through one of said chambers, means in the recirculating system to partially remove solvent from said recirculated atmosphere, means of revitalizing said recirculated atmosphere by the addition of pure atmospheric portions at a point away from said granular material, and means to dilute recirculated atmosphere by the addition of water vapor thereto at a point away from said granular material as a means of reducing thermal shock to said granular material.

15. The method of continuously stripping solvent from granular material comprising the steps of subjecting said material to solvent stripping atmospheres in successive stages which stages are substantially free of atmospheric interflow therebetween, causing said granular material to absorb sensible heat in one of said stages and to retain substantially all of said heat during the transition to the next of said stages, subjecting said material in one of said stages to a solvent stripping atmosphere which is recirculated continuously and wheren said recirculated atmosphere is cleansed of solvent carried therein and is continuously revitalized by the addition of pure atmospheric portions at a point distant from said granular material.

16. Process for evaporating solvent from solvent-extracted solid organic particles, comprising the steps of changing solvent-extracted solid organic particles into a desolventizer, moving said solid organic particles through said desolventizer, passing a gaseous fluid including an inert gas through said desolventizer in a plurality of parallel flows and in contact with said solid organic particles, heating said gaseous fluid prior to its entry into said desolventizer condensing at least a portion of the solvent vapor in the gaseous fluid leaving said desolventizer recycling the gaseous fluid not so condensed from said condensing step through said heating step to said desolventizer, supplying said last-mentioned gaseous fluid before said heating from a source of said inert gas at a substantially constant pressure, and maintaining said desolventizer in a particle-full condition during the operation thereof and supplying fresh inert gas of constant pressure to said system so as to maintain the pressure in the system at a constant level.

17. Process for removing residual solvent from solvent extracted vegetable seeds comprising the steps of placing the seeds in an elongated vertical vessel having deflecting baffles spaced periodically therethrough and feeding a first flow of inert gas below the vaporization temperature of said solvent to one side of a first elongated section of said vessel and removing said gas from a second side of said first elongated section in a plurality of parallel streams, and feeding a second flow of inert gas to one end of a second elongated section of said vessel and removing said gas from the other end of said second elongated section in a single series stream, and recycling gas from said first section through a condenser to remove solvent vapor therefrom and thence through a heater and back into said first section and feeding inert gas fed into said second section which is solvent-free.

18. Process for removing residual solvent from solvent extracted particulate vegetable material comprising the steps of placing the material in an elongated vertical vessel having deflecting baffles spaced periodically therethrough and feeding a first flow of inert gas below the vaporization temperature of said solvent to one side of a first section of said vessel and removing said gas from a second side of said first section in a plurality of parallel streams, and feeding a second flow of inert gas to one end of an elongated section of said vessel and removing said second flow from the other end of said section in a single series stream, and maintaining the said first section in a substantially-filled condition and recycling the gas from said first section through a condenser and a heater back into said first section.

References Cited

UNITED STATES PATENTS

| | | | |
|---|---|---|---|
| 2,571,143 | 10/1951 | Leslie | 34—269 X |
| 2,691,830 | 10/1954 | Karnofsky | 34—166 X |
| 2,701,920 | 2/1955 | Campbell | 34—170 X |
| 2,776,894 | 1/1957 | Kruse | 34—173 X |
| 3,126,285 | 3/1964 | Lippold | 34—173 X |

KENNETH W. SPRAGUE, Primary Examiner.